US009172258B2

(12) United States Patent
Song

(10) Patent No.: US 9,172,258 B2
(45) Date of Patent: Oct. 27, 2015

(54) CIRCUIT FOR BALANCING CELLS

(75) Inventor: Joonwoo Song, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 488 days.

(21) Appl. No.: 13/549,207

(22) Filed: Jul. 13, 2012

(65) Prior Publication Data

US 2013/0200852 A1 Aug. 8, 2013

(30) Foreign Application Priority Data

Feb. 7, 2012 (KR) ........................ 10-2012-0012308

(51) Int. Cl.
*H02J 7/00* (2006.01)
(52) U.S. Cl.
CPC .................... *H02J 7/0016* (2013.01)
(58) Field of Classification Search
USPC ................................................ 320/138, 118
See application file for complete search history.

(56) References Cited

U.S. PATENT DOCUMENTS

| 7,609,030 B2 * | 10/2009 | Uesugi et al. ................ 320/118 |
| 2007/0285058 A1 * | 12/2007 | Kuroda ........................ 320/118 |
| 2011/0193525 A1 * | 8/2011 | Ro ................................ 320/116 |

FOREIGN PATENT DOCUMENTS

| JP | 2007-318950 | 12/2007 |
| KR | 10-2011-0093023 | 8/2011 |

* cited by examiner

*Primary Examiner* — Edward Tso
*Assistant Examiner* — Robert Grant
(74) *Attorney, Agent, or Firm* — Robert E. Bushnell, Esq.

(57) ABSTRACT

A cell balancing circuit controlling balanced discharge of a plurality of battery cells, the cell balancing circuit having a balancing part sensing voltages of the battery cells, a controller responsive to an output of the balancing part to select one of the battery cells for discharge of the cell, and a resistance controller controlling discharge of the selected cell. The resistance controller includes at least one discharge circuit connected to the battery cells; and a plurality of resistors connected to output signal channels of the discharge circuit, the resistors being selectively connected in series according to a control signal of the controller to discharge the selected cell.

16 Claims, 3 Drawing Sheets

CIRCUIT FOR BALANCING CELLS

CLAIM OF PRIORITY

This application makes reference to, incorporated the same herein, and claims all benefits accruing under 35 U.S.C. §119 from an application for CIRCUIT FOR BALANCING CELLS earlier filed in the Korean Intellectual Property Office on the $7^{th}$ day of Feb. 2012 and there duly assigned Korean Patent Application No. 10-2012-0012308.

BACKGROUND OF THE INVENTION

1. Field of the Invention

Embodiments of the present invention relate to a circuit for balancing cells.

2. Description of the Related Art

A secondary battery is manufactured in the form of a cell and is coupled to a protection circuit, constituting a battery pack. The battery pack is capable of charging or discharging by an external power supply or load through an external terminal provided outside the battery pack. The battery pack generally includes one or multiple battery cells.

The battery pack including multiple battery cells may experience cell deterioration by continuously performed charging and discharging operations and the respective cells may deteriorate to different extents. Thus, there may be differences in the charge/discharge time and amount of each. A severely deteriorated cell has a short charging/discharging time, so that it may be the first cell to be fully charged or discharged. The remaining cells may be charged or discharged before they are fully charged or discharged. If this state continues, the severely deteriorated cell may be more severely deteriorated, causing fire or explosion.

SUMMARY OF THE INVENTION

Embodiments of the present invention provide a circuit for balancing cells, by controlling a resistance value of a resistance controller using a multiplexer (MUX) and a demultiplexer (DEMUX).

According to one aspect of the present invention, a circuit for balancing cells is provided, the cell balancing circuit may comprise a plurality of battery cells, a balancing part sensing voltages of the battery cells and comparing the sensed voltages, a controller responsive to output signals of the balancing part to control selection of one of the battery cells to balance the discharge of the plurality of battery cells, and a resistance controller controlling discharge of the battery cells. The resistance controller may comprise at least one discharge circuit connected to the battery cells, and a plurality of resistors connected to output signal channels of the discharge circuit, the resistors being selectively connected in series according to a control signal of the controller to discharge the selected one of the battery cells.

The discharge circuit may be a demultiplexer.

The number of output signal channels of the demultiplexer may be equal to the number of resistors.

The plurality of resistors may have the same resistance value.

The plurality of resistors may have different resistance values.

The balancing part may sense voltages of the plurality of battery cells and may further include a voltage sensing circuit for supplying the sensed voltage to the controller.

The controller may control the operation of the discharge circuit to balance battery cells having relatively large voltages according to individual voltages of the plurality of battery cells.

The resistance controller may comprise a plurality of the discharge circuits, each may be connected to a respective one of the plurality of battery cells, the plurality of the discharge circuits may be connected in parallel to the balancing part.

According to another aspect of the present invention, there is provided a circuit for balancing cells is provided, the cell balancing circuit may comprise a plurality of battery cells, a balancing part sensing voltages of the battery cells and comparing the sensed voltages, a controller responsive to output signals of the balancing part to control selection of one of the battery cells to balance the discharge of the plurality of battery cells, and a resistance controller controlling discharge of the battery cells. The resistance controller may comprise a cell balancing selection circuit selecting one of the battery cells in response to a first control signal output from the controller; a discharge circuit connected to the selected one of the battery cells through the cell balancing selection circuit, and a plurality of resistors connected to output signal channels of the discharge circuit, the resistors being selectively connected in series according to a second control signal output from the controller to discharge the selected battery cell.

The cell balancing selection circuit may be a multiplexer and the discharge circuit may be a demultiplexer.

The multiplexer may have at least two input signal channels connected to respective ones of the battery cells.

The number of output signal channels of the demultiplexer may be equal to the number of resistors.

The plurality of resistors may have the same resistance value.

The plurality of resistors may have different resistance values.

The balancing part may sense voltages of the plurality of battery cells and may further include a voltage sensing circuit for supplying the sensed voltages to the controller.

According to the present invention, cell balancing can be performed while controlling a resistance value of a resistance controller using a multiplexer (MUX) and a demultiplexer (DEMUX).

In addition, since cell balancing is performed while controlling a resistance value of a resistance controller using a multiplexer (MUX) and a demultiplexer (DEMUX) without using variable resistor, the manufacturing cost may be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, embodiments of embodiments of the invention will be described in detail with reference to the accompanying drawings such that they can easily be made and used by those skilled in the art.

Hereinafter, a cell balancing circuit 100 according to an embodiment of the present invention will be described in detail.

Figure 1:
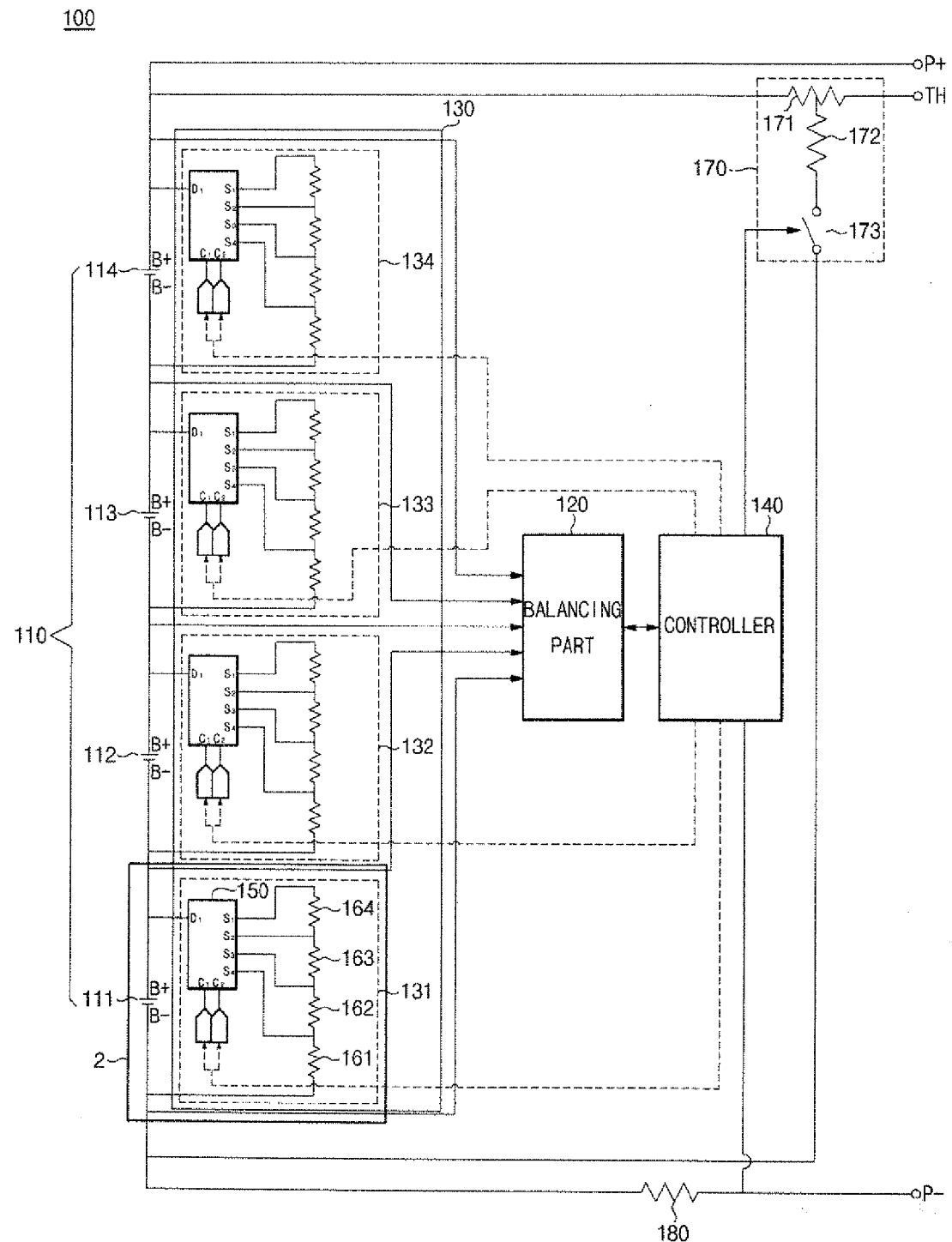
FIG. 1 is an exploded perspective view of a cell balancing circuit according to an embodiment of the present invention.
Figure 2:
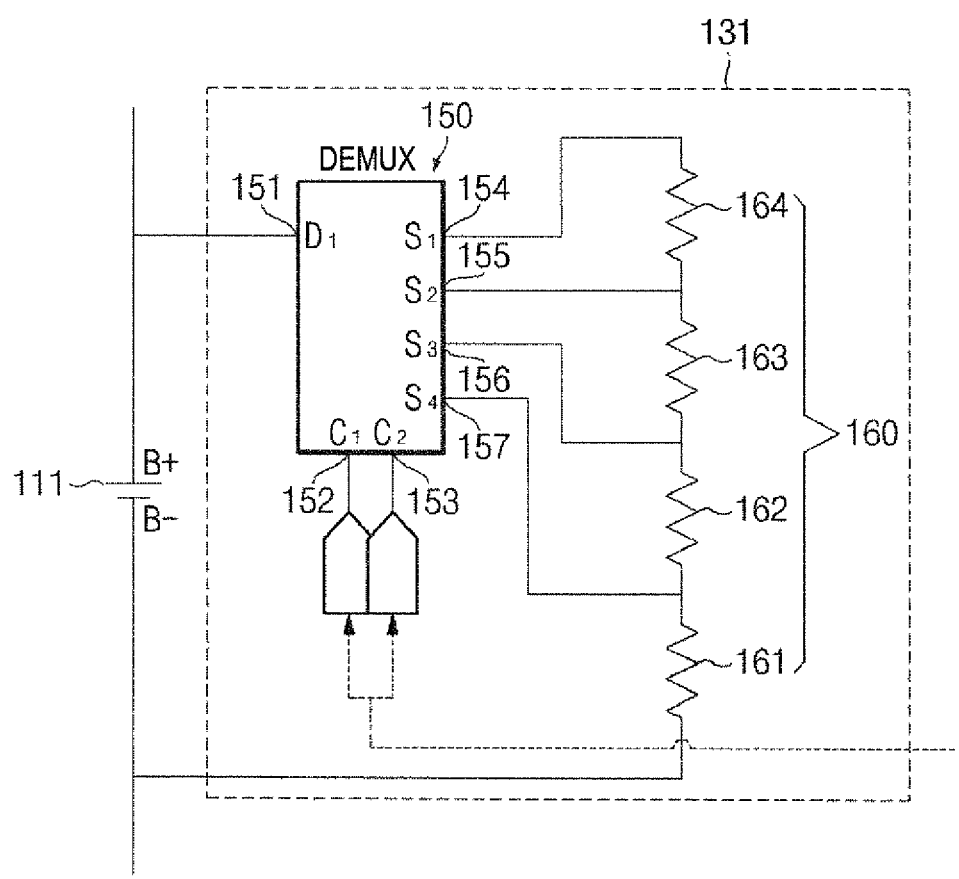
FIG. 2 is an enlarged circuit view of a region 2 of FIG. 1.

FIG. 1 is an exploded perspective view of a cell balancing circuit according to an embodiment of the present invention and FIG. 2 is an enlarged circuit view of a region 2 of FIG. 1.

The cell balancing circuit 100 includes a battery pack 110, a balancing part 120, a resistance controller 130 and a controller 140.

The cell balancing circuit 100 measures voltages of individual rechargeable battery cells 111, 112, 113 and 114 of the battery pack 110, the battery cells 111, 112, 113 and 114 are charged while balancing battery cells having relatively large voltages.

The battery pack 110 includes the rechargeable battery cells 111, 112, 113 and 114 serially connected to each other. The battery cells 111, 112, 113 and 114 may be selected from general lithium ion batteries, lithium polymer batteries and equivalents thereof. However, the types of the battery cells are not limited to those specifically described herein. In addition, the battery pack 110 may have a different number of battery cells according to the power capacity required by an external system. However, the number of battery cells is not limited to that specifically described herein. The battery cells 111, 112, 113 and 114 are serially connected between external terminals P+ and P− to the external system.

In order to sequentially or simultaneously balance the battery cells 111, 112, 113 and 114, the balancing part 120 is connected in parallel to the individual battery cells 111, 112, 113 and 114, respectively. In addition, the balancing part 120 supplies the sensed voltages of the individual battery cells 111, 112, 113 and 114 to the controller 140. In addition, the balancing part 120 compares the sensed voltages of the individual battery cells 111, 112, 113 and 114 with each other and transmits a cell balancing signal for balancing battery cells having relatively large voltages to the controller 140.

The resistance controller 130 includes a plurality of resistance controllers 131, 132, 133 and 134 connected to the individual battery cells 111, 112, 113 and 114, respectively. The resistance controller 130 may determine the number of the plurality of resistors 161, 162, 163 and 164 connected in series to the resistance controller 130 according to the cell balancing signal of the controller 140. Here, the controller 140 may be implemented by an integrated circuit (i.e., a single semiconductor chip) to exchange information with the balancing part 120.

A more detailed description of each resistance controller will be described with respect to element 2, of FIG. 1, with respect to FIG. 2.

Referring FIG. 2, the resistance controller 131 includes a discharge circuit 150 and a plurality of resistors 160. The resistance controller 131 is electrically connected to the battery cell 111.

The discharge circuit 150 is a demultiplexer (DEMUX), which will now be described. The demultiplexer (DEMUX) 150 outputs an input channel signal $D_1$ to a selected output channel of multiple output channels 154 to 157.

For example, in a case where the battery cell 111, among the individual battery cells 111, 112, 113 and 114, has the largest voltage, the controller 140 transmits a control signal as an output channel selection signal to the demultiplexer (DEMUX) 150 connected to the battery cell 111.

The demultiplexer (DEMUX) 150 selects one among the output channels 154 to 157 according to the control signal as the output channel selection signal to perform discharging for balancing cells.

When the control signal turns output channel switches $C_1$ and $C_2$ 'ON', a first output signal 154 is selected to then pass through four resistors 161, 162, 163 and 164 connected in series. When the control signal turns the output channel switch $C_1$ 'ON' and the output channel switch $C_2$ 'OFF', a second output signal 155 is selected to then pass through three resistors 162, 163 and 164 connected in series. When the control signal turns the output channel switch $C_1$ 'OFF' and the output channel switch $C_2$ 'ON', a third output signal 156 is selected to then pass through two resistors 163 and 164 connected in series. When the control signal turns the output channel switches $C_1$ and $C_2$ 'OFF', a fourth output signal 157 is selected to then pass through the resistor 164.

As shown in FIG. 2, the control signal as the output channel selection signal is described by way of example with regard to a case of the demultiplexer (DEMUX) 150 having four output channels. However, the ON/OFF selection of the control signal is not limited to the specific methods described herein.

The resistors 160 include a plurality of resistors 161, 162, 163 and 164. Since the plurality of resistors 161, 162, 163 and 164 are connected in series, they may have the same resistance value. Alternatively, the plurality of resistors 161, 162, 163 and 164 may have different resistance values. The resistors 160 are described with regard to a case where they include four resistors 161, 162, 163 and 164 connected in series, but the number of resistors is not limited thereto.

Referring again to FIGS. 1 and 2, the cell balancing circuit 100 selects an output channel of the resistance controller 130 according to the cell balancing signal of the controller 140 to perform a balancing operation on battery cells to be balanced. As a result, the cell balancing circuit 100 performs discharging by controlling the demultiplexer (DEMUX) 150 to match with a voltage difference between the battery cells to be balanced. Therefore, the resistance value can be controlled with simplified circuitry without using variable resistances.

In addition, the cell balancing circuit 100 includes an over-charge preventing part 170 for preventing an over-charge of the battery pack 110.

The over-charge preventing part 170 includes a fuse 171, a heating resistor 172 and a switch 173. The fuse 171 is connected between a highest potential battery cell among the battery cells 114 and a charge terminal TH. The heating resistor 172 is connected to the fuse 171. The switch 173 may be turned ON or OFF by the cell balancing signal of the controller 140. However, the component member of the cell balancing circuit 100 is not limited to the over-charge preventing part 170 specifically described herein. In an alternative embodiment, the over-charge preventing part 170 may include a plurality of field effect transistors.

Undefined reference numeral 180 denotes a current sensor for sensing the current flowing through the individual battery cells 111, 112, 113 and 114. The current sensor 180 is electrically connected to an analog front end and/or a microprocessing unit, thereby allowing the current flowing through the individual battery cells 111, 112, 113 and 114 to be sensed. Since the current sensor 180 and operations thereof are well known to one skilled in the art, a detailed description will be omitted.

Figure 3:
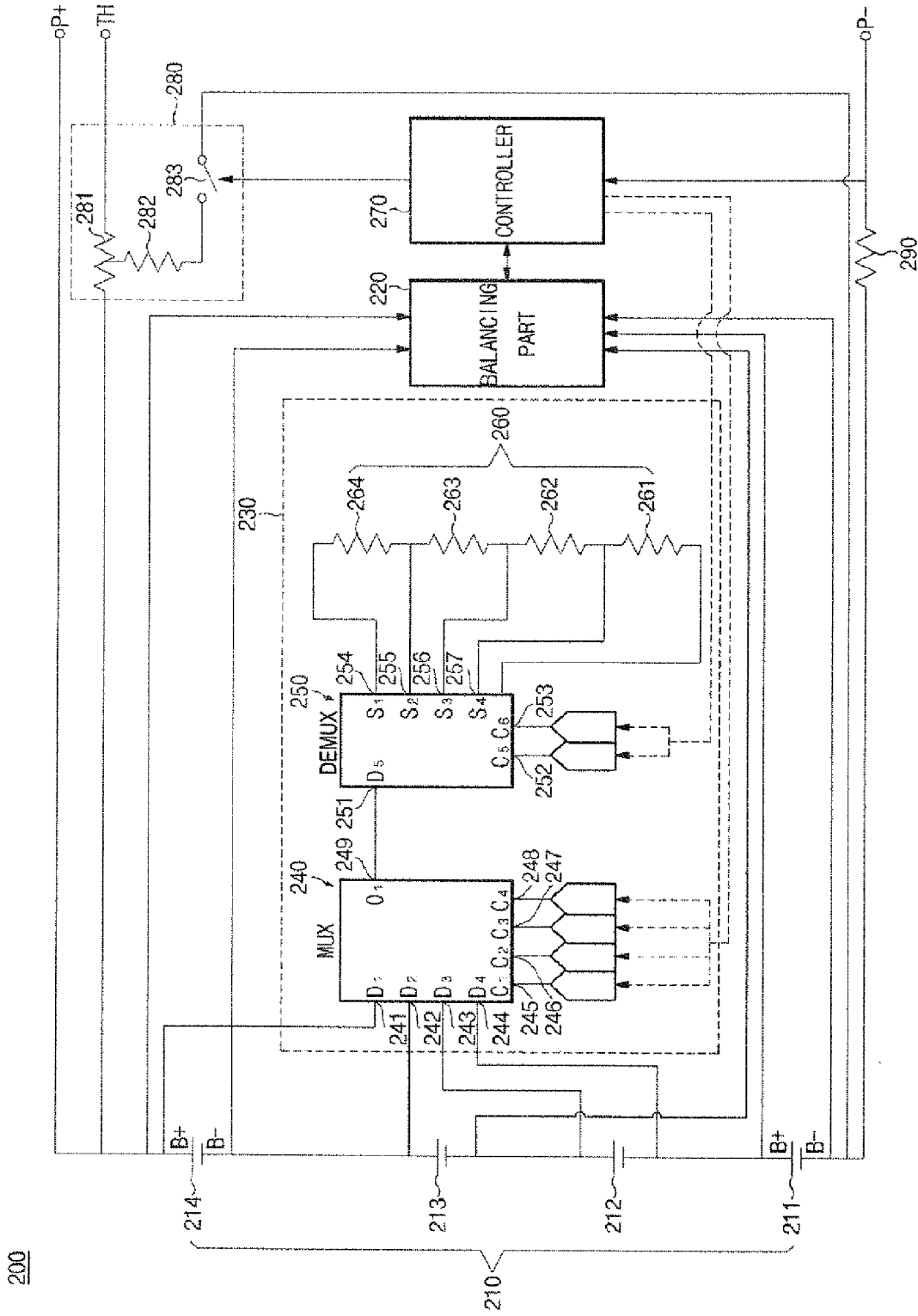
FIG. 3 is a circuit view of a cell balancing circuit according to another embodiment of the present invention.

FIG. 3 is a circuit view of a cell balancing circuit according to another embodiment of the present invention.

As shown in FIG. 3, the cell balancing circuit 200 according to another embodiment of the present invention is substantially the same as the cell balancing circuit 100 according to the previous embodiment in view of configuration, and the following description will focus on differences therebetween.

A resistance controller 230 includes a multiplexer (MUX) 240 in order to select a battery cell having relatively high voltages among the battery cells 211, 212, 213 and 214, connected in parallel to multiplexer (MUX) 240. The multiplexer (MUX) 240 will be described by way of example. The multiplexer (MUX) 240 selects one of multiple input channel signals $D_1$, $D_2$, $D_3$ and $D_4$ and outputs the selected input channel signal to an output channel 249. Controller 270 turns input channel switches 245 to 248, of multiplexer (MUX) 240, ON or OFF to select one of the multiple input channel signals $D_1$, $D_2$, $D_3$ and $D_4$ according to a control signal as a cell balancing signal.

In the illustrated embodiment shown in FIG. 3, four input channel switches 245 to 248 are provided. Alternatively, two input channel switches may be provided and two switches may be turned ON/OFF to select one of input channel signals. However, the number of input channel switches of the multiplexer (MUX) 240 is not limited to that specifically described herein.

The multiplexer (MUX) 240 is connected to a demultiplexer (DEMUX) 250 to perform a discharge operation on battery cells 211, 212, 213 and 214. The demultiplexer (DEMUX) 250 selects one of output channels 254 to 257 when switching output channel switches $C_1$ and $C_2$ are ON or OFF according to the control signal as an output channel selection signal of controller 270, thereby controlling a resistance value. In this case, since a plurality of resistors 261, 262, 263 and 264 are connected in series, they may have the same resistance value. Alternatively, the plurality of resistors 261, 262, 263 and 264 may have different resistance values.

The resistors 260 are described with regard to a case where they include four resistors 261, 262, 263 and 264 connected in series, but the number of resistors is not limited thereto.

The cell balancing circuit 200 performs a balancing operation on battery cells to be balanced by the multiplexer (MUX) 240. In addition, the cell balancing circuit 200 performs discharging by controlling the demultiplexer (DEMUX) 250 to match with a voltage difference between the battery cells to be balanced. Therefore, the resistance value can be controlled with simplified circuitry without using variable resistances.

In order to sequentially or simultaneously balance the battery cells 211, 212, 213 and 214, the balancing part 220 is connected in parallel to the individual battery cells 211, 212, 213 and 214, respectively. In addition, the balancing part 220 supplies the sensed voltages of the individual battery cells 211, 212, 213 and 214 to the controller 270. In addition, the balancing part 220 compares the sensed voltages of the individual battery cells 211, 212, 213 and 214 with each other and transmits a cell balancing signal for balancing battery cells having relatively large voltages to the controller 270.

Additionally, the cell balancing circuit 200 includes an over-charge preventing part 280 for preventing an over-charge of the battery pack 210.

The over-charge preventing part 280 includes a fuse 281, a heating resistor 282 and a switch 283. The switch 283 may be turned ON or OFF by the cell balancing signal of the controller 270. In an alternative embodiment, the over-charge preventing part 280 may include a plurality of field effect transistors.

Undefined reference numeral 290 denotes a current sensor for sensing the current flowing through the individual battery cells 211, 212, 213 and 214. The current sensor 290 is electrically connected to an analog front end and/or a microprocessing unit, thereby allowing the current flowing through the individual battery cells 211, 212, 213 and 214 to be sensed. Since the current sensor 290 and operations thereof are well known to one skilled in the art, a detailed description will be omitted.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A cell balancing circuit, comprising:
   a plurality of battery cells;
   a balancing part sensing voltages of the battery cells, and comparing the sensed voltages;
   a controller responsive to output signals of the balancing part to control selection of one of the battery cells to balance the discharge of the plurality of battery cells; and
   a plurality of resistance controllers, each resistance controller separately controlling discharge of a corresponding one of the battery cells, each resistance controller comprising:
   a discharge circuit connected to the battery cell; and
   a plurality of resistors connected to output signal channels of the discharge circuit, the resistors being selectively connected in series with each other according to a control signal of the controller to discharge the battery cell.

2. The cell balancing circuit of claim 1, each discharge circuit being a demultiplexer.

3. The cell balancing circuit of claim 2, a number of output signal channels of the demultiplexer being equal to the number of resistors.

4. The cell balancing circuit of claim 1, the plurality of resistors each having a same resistance value.

5. The cell balancing circuit of claim 1, the plurality of resistors each having a respective different resistance value.

6. The cell balancing circuit of claim 1, the balancing part further comprises a voltage sensing circuit for supplying the sensed voltages to the controller.

7. The cell balancing circuit of claim 6, the controller controlling an operation of each of the discharge circuits to balance battery cells having relatively large voltages as compared to individually sensed voltages of the plurality of battery cells.

8. The cell balancing circuit of claim 1:
   the plurality of the discharge circuits being connected in parallel to the balancing part.

9. A circuit for balancing cells, comprising:
   a plurality of battery cells;
   a balancing part sensing voltages of the battery cells, and comparing the sensed voltages;
   a controller responsive to output signals of the balancing part to control selection of one of the battery cells to balance the discharge of the plurality of battery cells; and
   a resistance controller controlling discharge of the battery cells, the resistance controller comprising:
   a cell balancing selection circuit selecting one of the battery cells in response to a first control signal output from the controller;
   a discharge circuit connected to the selected one of the battery cells through the cell balancing selection circuit; and
   a plurality of resistors connected to output signal channels of the discharge circuit, the resistors being selectively connected in series with each other according to a second control signal output from the controller to discharge the selected battery cell.

10. The cell balancing circuit of claim 9, wherein the cell balancing selection circuit being a multiplexer and the discharge circuit being a demultiplexer.

11. The cell balancing circuit of claim 10, wherein the multiplexer having at least two input signal channels connected to respective ones of the battery cells.

12. The cell balancing circuit of claim 10, a number of output signal channels of the demultiplexer being equal to the number of resistors.

13. The cell balancing circuit of claim 9, the plurality of resistors each having a same resistance value.

14. The cell balancing circuit of claim 9, the plurality of resistors each having a respective different resistance value.

15. The cell balancing circuit of claim 9, the balancing part further comprises a voltage sensing circuit for supplying the sensed voltage to the controller.

16. The cell balancing circuit of claim 9, the controller controlling operations of the cell balancing selection circuit and the discharge circuit to balance battery cells having relatively large voltages as compared to individually sensed voltages of the plurality of battery cells.

\* \* \* \* \*